United States Patent [19]
Adams, III et al.

[11] Patent Number: 5,852,609
[45] Date of Patent: Dec. 22, 1998

[54] METHOD AND APPARATUS FOR INTERFACING A MEDIA INDEPENDENT INTERFACE WITH DVB-COMPLIANT MODULATORS

[75] Inventors: Lewis E. Adams, III, Phoenix; Christopher L. Spearman, Tempe, both of Ariz.

[73] Assignee: Intel Corporation, Santa Clara, Calif.

[21] Appl. No.: 763,414

[22] Filed: Dec. 11, 1996

[51] Int. Cl.$^6$ .................................................. H04J 3/16
[52] U.S. Cl. ........................................ 370/465; 370/366
[58] Field of Search ................................. 370/389, 395, 370/366, 412, 503, 427, 507, 512, 516, 518, 520, 445; 375/351, 352

[56] References Cited

U.S. PATENT DOCUMENTS

| | | | |
|---|---|---|---|
| 4,858,232 | 8/1989 | Diaz et al. | 370/465 |
| 5,537,414 | 7/1996 | Takiyasu et al. | 370/347 |
| 5,577,069 | 11/1996 | Lau et al. | 375/242 |
| 5,604,867 | 2/1997 | Harwood | 395/200.63 |
| 5,655,140 | 8/1997 | Haddock | 395/200.76 |
| 5,673,254 | 9/1997 | Crayford | 370/231 |

OTHER PUBLICATIONS

*Media Access Control (MAC) Parameters, Physical Layer, Medium Attachment Units, and Repeater for 100 Mb/s Operation, Type 100BASE–T (Clauses 21–30)*, IEEE Standards for Local and Metropolitan Area Networks: Supplement to Carrier Sense Multiple Access with Collision Detection (CSMA/CD) Access Method and Physical Layer Specifications, IEEE Std 802.3u–1995 (Supplement to ISO/IEC 8802–3: 1993 [ANSI/IEEE Std 802.3, 1993 Edition]), The Institute of Electrical & Electronics Engineers, Inc., 1995.

*Primary Examiner*—Dang Ton
*Assistant Examiner*—Phirin Sam
*Attorney, Agent, or Firm*—Blakely, Sokoloff, Taylor & Zafman

[57] ABSTRACT

A method for interfacing a media independent interface with a DVB compliant modulator includes the step of receiving nibbles of data from a media independent interface in accordance with a transmit clock signal and a holdoff signal during assertion of a transmit enable signal, wherein the nibbles of data are a portion of a variable sized packet. The nibbles of data are stored into a first buffer. The transmit clock signal is disabled. The nibbles of data are shifted out of the first buffer in accordance with a serial clock signal to provide a first bitstream. The first bitstream is framed into a predetermined packet size. The holdoff signal is asserted to halt the first bitstream. A synchronization indicator is serially inserted into the first bitstream in accordance with the serial clock signal to form a second bitstream. The second bitstream is parallelized to form parallelized data. The parallelized data and a synchronization signal corresponding to the synchronization indicator are synchronously provided in accordance with a parallel clock signal.

9 Claims, 3 Drawing Sheets

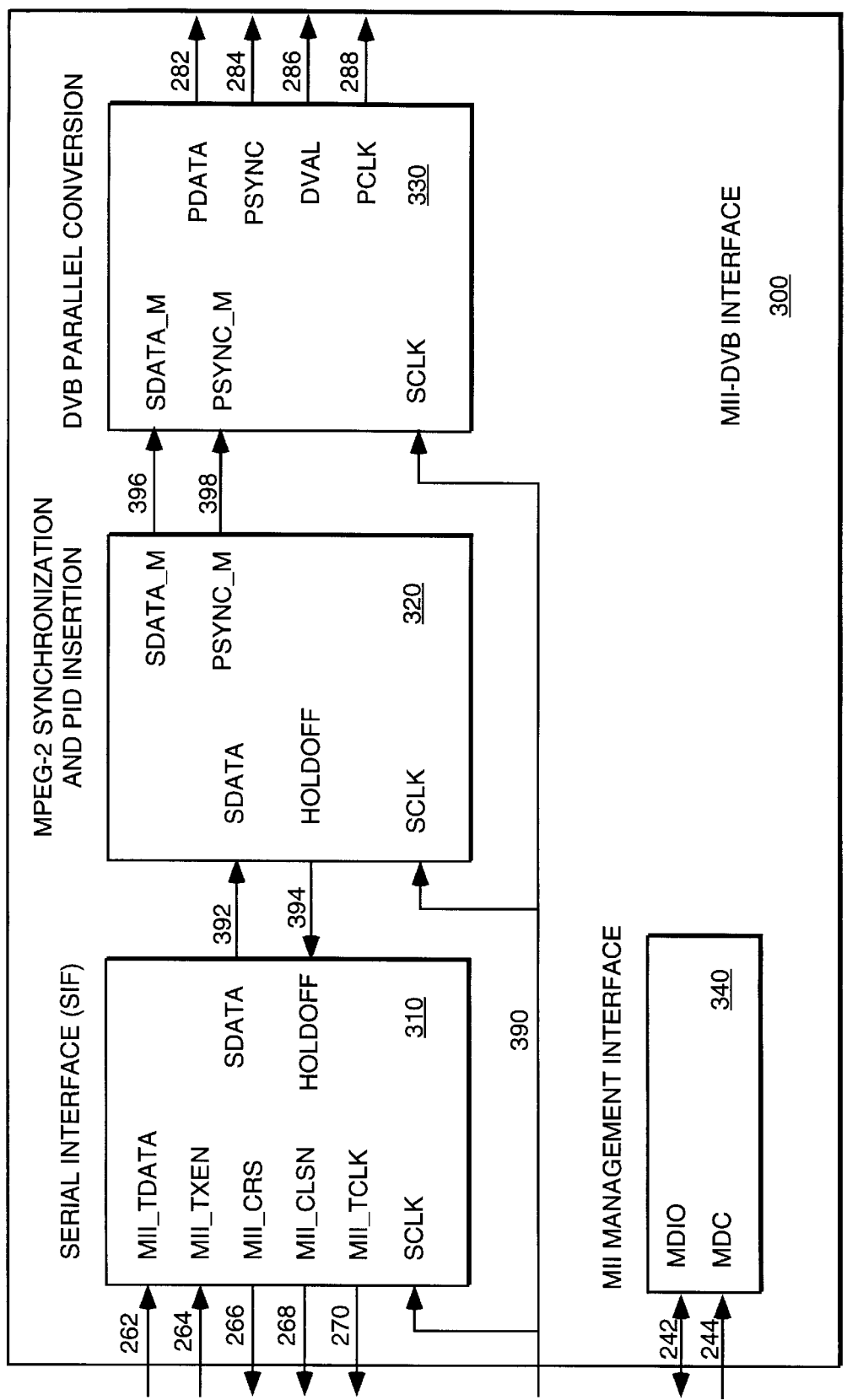

METHOD AND APPARATUS FOR INTERFACING A MEDIA INDEPENDENT INTERFACE WITH DVB-COMPLIANT MODULATORS

FIELD OF THE INVENTION

This invention relates to the field of communications. In particular, this invention is drawn to providing an interface between an IEEE 802.3 u media independent interface and a DVB-PI-227 compliant modulator.

BACKGROUND OF THE INVENTION

Remote access to a server on a computer network is often gained through the use of a telephone modem. For example, individuals communicating on the Internet typically access an Internet Service Provider using a dial-in modem and a telephone line in order to connect with a server.

One disadvantage of a standard telephone modem is that data communication rates are presently practically limited to approximately 28.8 kilobaud/second. At this rate, downloading a large file (e.g., several megabytes) may take a considerable amount of time.

Some servers accessed by the remote user may be using data communication equipment based on Ethernet or Fast Ethernet standards which permit data communication rates up to 10 Mb/s and 100 Mb/s, respectively.

T1 and Integrated Services Digital Network (ISDN) telephone lines are available for greater communications speed than possible with a standard telephone line. Unfortunately, none of the standard, T1, nor ISDN telephone lines permit communication at 10 Mb/s or 100 Mb/s rates. The maximum data communications rate for T1 or ISDN telephone lines is considerably less than 10 Mb/s (i.e., at least one order of magnitude less).

In addition, T1 and ISDN telephone lines are substantially more expensive to install and use than standard telephone lines. Furthermore, the modems required for T1 and ISDN data communication rates are considerably more expensive than standard telephone modems.

An alternative to a dial-up connection is to use a direct connection to each server that the remote user wishes to communicate with. This alternative, however, tends to be prohibitively expensive and impractical for a even a small number of clients.

Thus the communications link between the remote user and the server tends to be one of the primary bottlenecks in achieving greater data communication rates between remote users and servers on computer networks.

SUMMARY OF THE INVENTION

In view of limitations of known systems and methods, a method for interfacing a media independent interface with a DVB compliant modulator is provided. The method includes the step of receiving nibbles of data from a media independent interface in accordance with a transmit clock signal and a holdoff signal during assertion of a transmit enable signal, wherein the nibbles of data are a portion of a variable sized packet. The nibbles of data are stored into a first buffer. The transmit clock signal is disabled. The nibbles of data are shifted out of the first buffer in accordance with a serial clock signal to provide a first bitstream. The first bitstream is framed into a predetermined packet size. The holdoff signal is asserted to halt the first bitstream. A synchronization indicator is serially inserted into the first bitstream in accordance with the serial clock signal to form a second bitstream. The second bitstream is parallelized to form parallelized data. The parallelized data and a synchronization signal corresponding to the synchronization indicator are synchronously provided in accordance with a parallel clock signal.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 3 illustrates components of the MII-DVB interface.

DETAILED DESCRIPTION

The Institute of Electrical and Electronics Engineers has set forth a number of standards for local and metropolitan area networks. In particular, CSMA/CD Access Method and Physical Layer Specifications (IEEE 802.3-1993) is a standard governing standard Ethernet networks. In accordance with IEEE 802.3-1993, standard Ethernet is capable of approximately 10 Mb/s maximum throughput.

Another Ethernet standard entitled "Media Access Control (MAC) Parameters, Physical Layer, Medium Attachment Units, and Repeater for 100 Mb/s Operation, Type 100BASE-T" (IEEE Standard 802.3u-1995) has been designed to provide for 100 Mb/s using the same Carrier Sense Multiple Access/Carrier Detect (CSMA/CD) access method as standard Ethernet. Due to the ten-fold increase in data rates, this standard is also referred to as Fast Ethernet.

Fast Ethernet provides for a Media Independent Interface. The Media Independent Interface allows coupling of Data Communication Equipment having different OSI model physical layer implementations (e.g., 100BASE-T, 100BASE-T4, 100BASE-TX, 100BASE-X, and 100BASE-FX).

Figure 1:
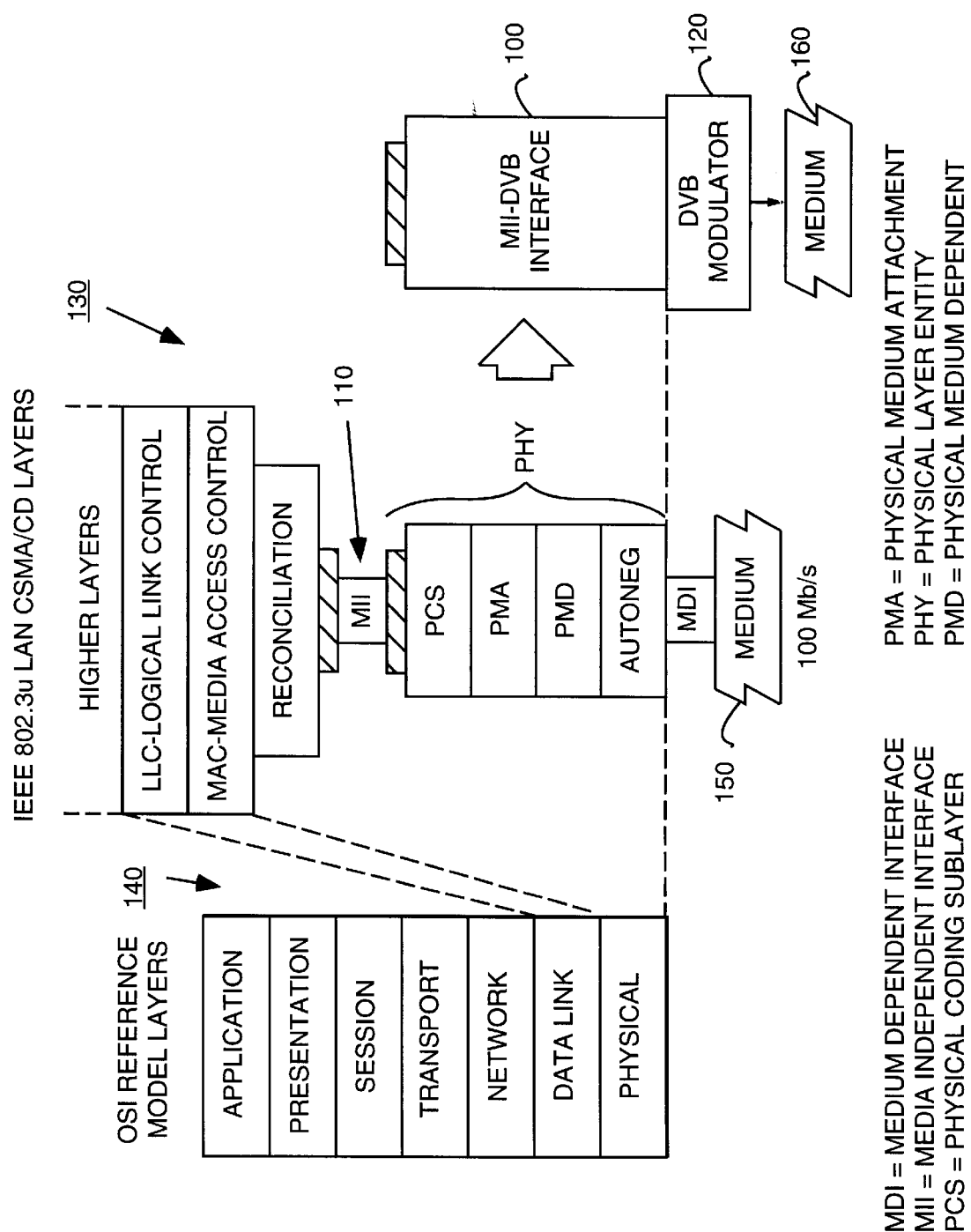
FIG. 1 illustrates the correspondence between the ISO Open Systems Interconnect Reference Model, the IEEE Std. 802.3 u-1995 model, and the Media Independent Interface-Digital Video Broadcoast (MII-DVB)interface.

FIG. 1 illustrates the application of IEEE Std. 803.2u-1995 (Fast Ethernet) to the 7-layer OSI Reference Model 110. In particular, the IEEE Std. 803.2u-1995 provides for a Media Independent Interface 130 for coupling to various embodiments of the Physical Layer Entity (PHY). PHY is coupled to a pre-determined medium 140 using a Medium Dependent Interface (MDI). The standard only supports specified mediums (140) include 100Base-T, 100Base-TX, 100Base-FX, and 100Base-X.

One medium which may provide greater communication rates than dial-in connections is the network of community antenna television (CATV) coaxial cable available for distributing cable television programs to viewers. The network of CATV associated with a given distribution center or "headend" is referred to as a cable plant.

The headend was previously used to transmit primarily analog video data. Standards have been promulgated, however, for transmission of digital data using available analog broadcast equipment.

In particular, the Digital Video Broadcast (DVB) committee of the European-based Digital Audio Video Industry Consortium (DAVIC) has developed some of these standards. One standard for encoding digital data for transmission using standard television broadcast equipment is referred to as DVB-PI-227. For example, "DVB-PI227 Interfaces for CATV/SMATV Headends and Similar Professional Equipment (Draft TM1449 Rev. 2, Jun. 6, 1996)" describes physical interfaces for the interconnection of digital signal processing devices for professional CATV/SMATV headend equipment or for similar systems, such as in uplink stations. "Headend" includes equipment connected between receiving antennas or other signal sources and the remainder of the cable plant. The headend may include, for example, antenna amplifiers, frequency converters, combiners, separators, modulators, and generators.

Unfortunately DVB-PI-227 uses media, signals, and protocols, however, which are incompatible with those of the Fast Ethernet, IEEE Std. 802.3u-1995. Thus the MII interface and DVB-PI-227 compliant equipment are not immediately compatible.

The media independent interface (MII) is a readily available interface found in Fast Ethernet data communication equipment such as a 7200 series router manufactured by Cisco Systems, Inc. of San Jose, Calif. The Mul is implemented as an MII port on the data communication equipment. The operation and control of the MII port is governed by IEEE Std. 802.3u-1995 entitled "Media Access Control (MAC) Parameters, Physical Layer, Medium Attachment Units, and Repeater for 100 Mb/s Operation, Type 100BASE-T" which is explicitly incorporated herein by reference (hereinafter "IEEE 802.3u").

Commercially available DVB PI-227 compliant modulators (hereinafter "DVB modulators") use varying schemes for modulating the digital data depending upon the method of broadcast. For example, Quadrature Phase Shift Keying (QPSK) modulation is typically used with headend equipment for satellite communications. Quadrature Amplitude Modulation (QAM) is typically used with headend equipment for television and CATV applications. Each of the DVB modulation schemes, however uses a common data input standard governed by the DVB-PI-227 specification. The data input standard is described, for example, in DVBPI-227 Interfaces for CATV/SMATV Headends and Similar Professional Equipment (Draft TM1449 Rev. 2, Jun. 6, 1996) which is explicitly incorporated herein by reference (hereinafter "DVB-PI-227").

One example of a DVB modulator for modulating digital signals for communication on CATV and SMATV headend equipment include the QAMLink BCM93120 DVB Development System, manufactured by Broadcom Corporation of Irvine, Calif. Another example of a DVB modulator is the QAM DVB Modulator manufactured by Tonna Electronique of France. FIG. 1 illustrates the correspondence between the 7-layer ISO Open Systems Interconnect Reference Model (140), the IEEE Std. 802.3u-1995 model (130), and the MII-DBV interface (100). MII-DVB interface 100 replaces the PHY sublayers. In particular, MII-DVB interface permits coupling MII layer 110 to a DVB modulator 120 for subsequent distribution of the signal to a headend for CATV/SMATV broadcast. Thus medium 160 can be any medium coupled to a CATV/SMATV headend including coaxial cable or space (for satellite transmissions).

Figure 2:
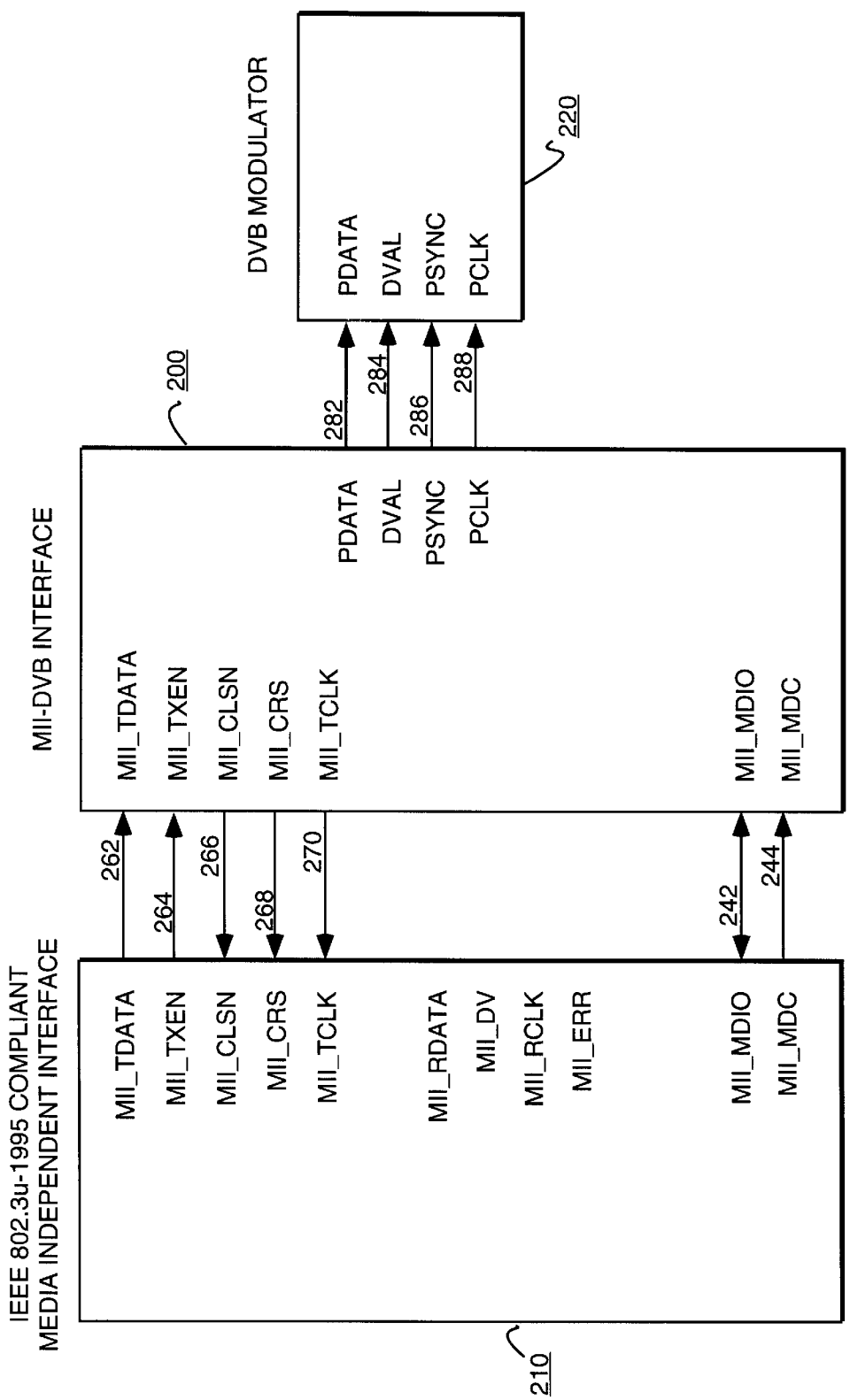
FIG. 2 illustrates communications between an IEEE 802.3 u-1995 compliant media independent interface, the MII-DVB interface, and a DVB modulator.

FIG. 2 illustrates an MII-DVB interface 200 for communicating data between an IEEE 802.3u-1995 compliant media independent interface 210 and an industry standard DVB modulator 220. A description of the signals as they correspond to signals defined by their respective governing standards is described below.

MII_TDATA 262 corresponds to the IEEE 802.3u Transmit Data (TXD) signal. MII_TDATA is a bundle of 4 data signals (corresponding to a four bit bus) provided by the MII. Thus data is transferred as serial nibbles of data.

MII_TXEN 264 corresponds to the IEEE 802.3u Transmit Enable (TX_EN) signal. MII_TXEN 214 indicates whether nibbles of data are presented for transmission from the MII.

MII_CLSN 266 is provided by the MII_DVB interface 200. MII_CLSN corresponds to the IEEE 802.3u Collision Detected (COL) signal. MII_CLSN 216 is asserted by the MII-DVB interface upon detection of a collision and remains asserted while the collision condition persists. In one embodiment, MII_CLSN 216 is not implemented. In an alternative embodiment, MII_CLSN 266 is provided to permit a request to resend the packet.

MII_CRS 268 is provided by the MII_DVB interface 200. MII_CRS corresponds to the IEEE 802.3u Carrier Status (CRS) signal.

MII_TCLK 270 corresponds to the IEEE 802.3u Transmit Clock (TX_CLK) signal. The Transmit Clock (TX_CLK) signal is defined as a continuous clock that provides the timing reference for the transfer of the TX_EN, TXD, and TX_ER signals. The TX_CLK frequency is defined as approximately 25% of the nominal transmit data rate.

MII_MDIO 242 and MII_MDC 244 correspond to the IEEE 802.3u Management Data Input/Output (MDIO) and Management Data Clock (MDC) signals, respectively. MII_MDC serves as the timing reference for transfer of information on the MII_MDIO signal line. MII_MDIO is a bidirectional signal used to transfer control information and status between the MII and the MII-DVB interface. MDC is provided by the MII.

The data frame structure transmitted through the MII has a frame format including an inter-frame, a preamble, a start of frame delimiter (SFD), transmitted data, and an end of frame delimiter (EFD).

The inter-frame corresponds to an absence of data activity such as the period between transmission or receipt of subsequent Ethernet packets. The inter-frame is indicated by the de-assertion of the MII_TXEN. The preamble begins a frame transmission. IEEE 802.3u specifies sending 8 bits of alternating "1" and "0" bit values seven times in order to indicate the beginning of a frame transmission (i.e., in order of transmission the preamble is 10101010 transmitted seven times). SFD indicates the start of a frame and follows the preamble. The bit value of the SFD in the bit order of transmission is specified as 10101011. The data transmitted in a well formed frame consists of n octets of data transmitted as 2n nibbles. MII_TXEN is asserted to indicate data is ready to be transmitted during transmission of the preamble, the SFD, and the data. De-assertion of the MII_TXEN signal constitutes an end of frame delimiter and therefore signals the end of a packet for Ethernet packets.

DVB-PI-227 requires that data be in an MPEG-2 transport stream packet. The packets are 188 or 204 byte packets. DVB-PI-227 provides for a parallel interface for communicating the packets using a clock signal, a data signal, a valid data signal, and a synchronization signal as described below.

PDATA 282 corresponds to DVB-PI-227 8 bit data bus. PDATA is used to communicate the data to be transmitted from the MII-DVB interface 200 to the DVB compliant modulator 220.

PSYNC 286 corresponds to the DVB-PI-227 PSYNC signal. PSYNC is a synchronization signal used to indicate the beginning of a DVB frame from MII-DVB interface 200. A DVB frame may optionally be a 188 byte frame or a 204 byte frame. One byte of the 188 byte or 204 byte frame is used for synchronization leaving either 187 bytes or 203 bytes for data, respectively. For 204 byte frames, up to 16 bytes may be padding bytes for ease of compatibility with the 188 byte frame format.

DVAL 284 corresponds to the DVB-PI-227 DVALID signal. DVAL 284 is used to indicate when PDATA 282 includes padding bytes. PCLK 288 corresponds to the DVB-PI-227 clock signal. PCLK 288 is used for synchronous transmission of the DVAL, PSYNC, and PDATA signals to the DVB modulator 220.

FIG. 3 illustrates functional blocks of the MII-DVB interface 300 (i.e., MII-DVB interface 210 in FIG. 2.) MII-DVB interface 300 includes 4 functional blocks: serial interface (SIF) 310, MPEG-2 synchronization and packet id insertion 320, DVB parallel conversion 330, and MII management interface 340.

MII management interface 340 is required for compliance with IEEE 802.3u. At a minimum, MII Management Interface 340 provides a control register and a status register which can be accessed by the MII using the MDIO 242 bidirectional signal in accordance with the MDC 244 signal. Management Interface 340 uses a frame format and a protocol specification for exchanging management frames as set forth in IEEE Std 802.3u-1995 at § 22.2.4.

Serial interface 310 serializes the data received from an MII port. SIF 310 performs a serial nibble to serial bit conversion, data rate throttling of the MII, zero bit insertion, end of packet (EOP) insertion, and idle data insertion.

Data rate throttling is necessary because the DVB modulator cannot transmit data at 100 Mb/s even though the MII may provide the data at 100 Mb/s. Data rate throttling is accomplished by controlling MII_TCLK.

As stated above, MII_TXEN 264 is asserted when valid data is available on the MII_TDATA bus 262. When MII_TXEN is enabled, MII_TDATA is received serially as nibbles at a rate determined by MII_TCLK 270. During the time MII_TXEN is asserted, SIF 310 first generates a single clock pulse on MII_TCLK. This pulse serves to load a buffer within SIF 310 with the contents of MII_TDATA. In one embodiment, the buffer is a first in first out (FIFO) buffer.

The contents of the buffer are shifted out through SDATA 392 at a rate determined by the serial clock signal SCLK 390. In one embodiment, when the last bit is shifted, SIF 310 generates another single clock pulse on MII_TCLK 270 to load another nibble of data into the buffer. In another embodiment, MH_TCLK clock pulses are provided until the buffer is full before the buffer is serially shifted out through SDATA 392.

The data received from the MII port is part of a variable length packet. Once the entire packet has been transmitted by the MII port, the MII_TXEN signal is de-asserted. Upon de-assertion of the MII_TXEN signal, the MII-DVB interface 310 provides a continuous MII_TCLK clock signal to the MII port. Thus the data rate is throttled when MII_TXEN is asserted by controlling MII_TCLK to prevent receiving subsequent nibbles of data until SDATA has been serially shifted out at a rate determined by SCLK.

The nominal MII_TCLK frequency should not exceed 25% of the nominal transmit data rate of the data communications equipment. In one embodiment, the MII_TCLK nominal frequency is 25 MHz (i.e., for 100 MHz data communications equipment). In another embodiment, the MII_TCLK nominal frequency is 2.5 MHz (i.e., for 10 Mb/s data communications equipment).

SIF 310 generates the MII_CRS 266 signal from the received MII_TXEN 264 signal. This can be accomplished, for example, by providing the MII_TXEN signal for return transmission as the MII_CRS signal.

MII_TXEN 264 transitions from asserted to de-asserted to indicate the end of a packet of data. SIF 310 generates an end of packet (EOP) indicator for the serial data stream in order that the end of packet can be detected within the serial data stream without the use of additional control signals. In one embodiment, the EOP indicator is a sequence of a "0" followed by sixteen "1" s output serially through SDATA when MII_TXEN transitions from an asserted to a de-asserted state.

In order to ensure that EOP is distinct from the actual packet data, a "0" bit is inserted after any sequence of 15 "1" s. This zero bit insertion ensures that EOP is unique from the data being transmitted. The zero bit insertion can be accounted for by data communications equipment and data terminal equipment at the receiving end by removing any "0" bit immediately following a series of 15 ones. If a "0" followed by 15 "1" s is received, then the receiving end should assume an EOP has been received.

The length of the IEEE 802.3u inter-frame is variable. Once an EOP has been received, there is no expectation as to when the next packet will be transmitted. Broadcast carriers, however, should be continuously modulated. The DVB modulator therefore should continuously receive transmission data in order to ensure a continuously modulated broadcast carrier. This is accomplished by the insertion of idle bytes into the serial data stream.

Once the EOP has been inserted into the serial data stream provided by SDATA, an idle data pattern is inserted into the SDATA bitstream. This can be accomplished by continuously placing idle data bytes in the buffer and serially shifting them out through SDATA 392 until MII_TXEN 264 is asserted again.

The value of the idle data byte is selected to ensure that the received data is not interpreted as a start of packet. In order to ensure that the received data is not interpreted as a start of packet, the value of the idle byte is selected to be unique from the IEEE 802.3u preamble definition (i.e., "10101010"). In one embodiment, the idle byte has the value "00110011," however any value unique from the sequence "10101010" is acceptable.

The bitstream generated by the SIP 310 block is provided to block 320 for MPEG-2 synchronization. Block 320 also permits optional insertion of program identification description (PID) for transmission. Block 320 counts the number of bytes received from the SDATA bitstream while providing the SDATA bitstream to block 330 through SDATA_M 396. SDATA_M is also clocked by SCLK 390.

Once SDATA has provided 187 bytes, block 320 asserts the HOLDOFF signal. HOLDOFF disables the SIF 310 from clocking the SDATA bitstream when asserted. While HOLDOFF is asserted, block 320 inserts a synchronization byte (e.g., 0x47) into the SDATA bitstream so that the SDATA_M bitstream comprises the SDATA bitstream plus a synchronization byte. The PSYNC_M 398 signal is asserted while the synchronization byte is being serially shifted into the SDATA_M bitstream. MPEG-2 data frames permit up to 204 bytes of data, thus 16 bytes are available and can consist of padding or other data. These 16 bytes can be used to insert PID information if desired. PID information can be used to indicate the content of the data or the source of the data. After insertion of the synchronization byte and optional PID information into the SDATA_M bitstream, the byte count is initialized to zero and HOLDOFF is de-asserted.

Block 330 performs the conversion of the serial bitstream from SDATA_M into a parallel data format for the DVB modulator. Serial data from SDATA_M 396 is clocked into a buffer using the SCLK 390 signal. The frequency of the SCLK signal is divided by 8 to provide the PCLK 288 signal. DVALID, PSYNC, and PDATA are synchronous to PCLK.

When PCLK 288 is asserted, the contents of the buffer are latched to provide the PDATA 282 signal. The status of PSYNC_M 398 is latched to provide the PSYNC 284 signal. Thus PSYNC_M is effectively delayed by 8 SCLK cycles to provide PSYNC.

DVB-PI-227 specifies Low Voltage Differential Signaling (LVDS) for the synchronous parallel interface. Thus, for example, if complementary metal oxide semiconductor (CMOS) or transistor-transistor logic (TTL) devices are used then LVDS drivers may be required to provide CMOS-to-LVDS or TTL-to_LVDS signal conversion. In one embodiment, block 330 includes drivers to provide LVDS levels for the synchronous parallel interface. SCLK is selected to have a frequency compatible with the DVB modulation equipment. In one embodiment, SCLK is approximately 38.1 MHz.

The MII-DVB interface discussed above is particularly suitable for asymmetrical communications between a remote user and a server. For example, users who browse the World Wide Web on the Internet tend to retrieve (i.e., download) considerably more information than they upload. This results in a larger bandwidth requirement for downstream communications (i.e., to the remote user) than upstream communications (i.e., to the server).

Given that the DVB-PI-227 standard is directed to SMATV and CATV applications, an MII-DVB interface provide Fast Ethernet packets to a headend which can provide the packets to a remote user via multiple transmission mediums including satellite or CATV distribution networks.

Standard telephone modems may serve to adequately support the upstream data rates. The data is retrieved downstream by tuning a DVB demodulator to a particular channel. Thus a microprocessor based personal computer can achieve significantly greater bidirectional communication rates using a standard telephone modem in conjunction with pre-existing CATV coaxial connections. Furthermore, the DVB modulated packet data may be located on a CATV channel such that reception of other CATV channels is not impaired.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method for interfacing a media independent interface with a Digital Video Broadcast (DVB) compliant modulator, comprising the steps of:

a) receiving nibbles of data from the media independent interface in accordance with a transmit clock signal and a holdoff signal during assertion of a transmit enable signal, wherein the nibbles of data are a portion of a variable sized packet;

b) storing the nibbles of data into a first buffer;

c) disabling the transmit clock signal;

d) shifting the nibbles of data out of the first buffer in accordance with a serial clock signal to provide a first bitstream;

e) framing the first bitstream into a predetermined packet size;

f) asserting the holdoff signal to halt the first bitstream;

g) serially inserting a synchronization indicator into the first bitstream in accordance with the serial clock signal to form a second bitstream;

h) parallelizing the second bitstream to provide parallelized data;

i) synchronously providing the parallelized data and a synchronization signal corresponding to the synchronization indicator in accordance with a parallel clock signal.

2. The method of claim 1 wherein a nominal frequency of the transmit clock is approximately 25 MHz.

3. The method of claim 1 wherein a nominal frequency of the serial clock is approximately 38.1 MHz.

4. The method of claim 1 wherein a nominal frequency of the parallel clock is approximately one-eighth a nominal frequency of the serial clock.

5. The method of claim 1 further comprising the steps of:

j) continuously inserting an idle byte into the first serial bitstream in accordance with the serial clock signal while the transmit enable signal is de-asserted.

6. The method of claim 5 wherein a value of the idle byte is distinct from a preamble of the variable sized packet.

7. The method of claim 1 further comprising the steps of:

j) inserting an end of packet indicator into the first serial bitstream in accordance with the serial clock signal when the transmit enable signal transitions from an asserted state to a de-asserted state.

8. The method of claim 7 wherein the end of packet indicator is a sequence beginning with a "0" followed by fifteen "1"s.

9. The method of claim 1 further comprising the step of:

j) inserting a "0" into the first serial bitstream, if the variable sized packet includes a sequence of "0" followed by sixteen "1"s, wherein the "0" is inserted into the first serial bitstream after the fifteenth "1".

* * * * *

UNITED STATES PATENT AND TRADEMARK OFFICE
CERTIFICATE OF CORRECTION

PATENT NO. : 5,852,609
DATED : December 22, 1998
INVENTOR(S) : Adams, III et al.

It is certified that error appears in the above-identified patent and that said Letters Patent is hereby corrected as shown below:

Column 6,
Line 48, delete "SIP" and insert -- SIF --.

Signed and Sealed this

Thirteenth Day of May, 2003

JAMES E. ROGAN
*Director of the United States Patent and Trademark Office*